(No Model.)

S. WALES.
CONNECTION FOR BELTS, BANDS, &c.

No. 348,871. Patented Sept. 7, 1886.

Witnesses:
Walter E. Lombard.
Franklin D. Child.

Inventor:
Sigourney Wales,
by N. C. Lombard
Attorney.

United States Patent Office.

SIGOURNEY WALES, OF CAMBRIDGE, MASSACHUSETTS, ASSIGNOR TO HARRIOT H. WALES, OF SAME PLACE.

CONNECTION FOR BELTS, BANDS, &c.

SPECIFICATION forming part of Letters Patent No. 348,871, dated September 7, 1886.

Application filed March 27, 1886. Serial No. 196,779. (No model.)

*To all whom it may concern:*

Be it known that I, SIGOURNEY WALES, of Cambridge, in the county of Middlesex and State of Massachusetts, have invented certain new and useful Improvements in Connections for Belts, Bands, &c., of which the following, taken in connection with the accompanying drawings, is a specification.

My invention relates to connections for belts, bands, &c.; and it consists of a flat piece of metal provided on one side with a device by which a strap or band may be secured thereto, and provided at its opposite side with a hook with which a loop formed in the opposite end of said strap or band may be readily attached and detached, all as will be more fully understood by reference to the description of the drawings, and to the claims to be hereinafter given.

Figure 1:
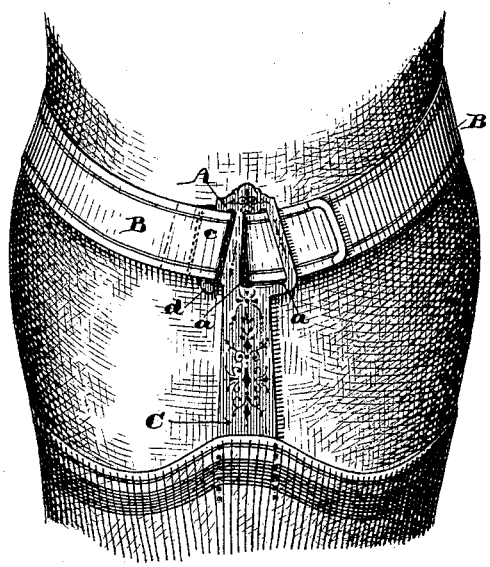
Figures 3, 5, 6, 9:
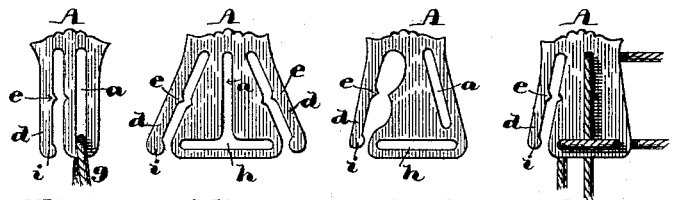
Figures 4, 7, 8:
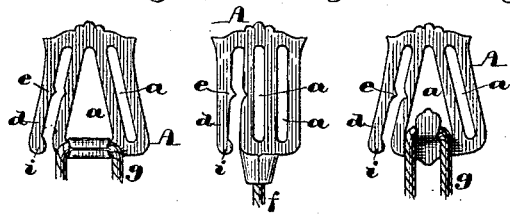
Figure 2:
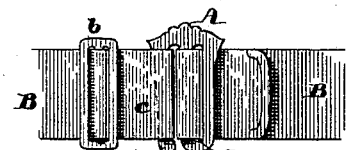

Of the drawings, Figure 1 represents a view of a portion of a leg upon which is illustrated one form of my improved connection as adapted in connection with a suitable band for supporting a gentleman's stocking. Fig. 2 represents a view of a much simpler form as adapted for securing together the two ends of a lady's garter. Fig. 3 represents a view of the same form in connection with a piece of cord to which a clasp may be attached to adapt the same for gentlemen's wear. Fig. 4 represents a view of a similar form provided with a suitable socket for receiving the knotted end of a single cord. Fig. 5 represents a view of a similar form, but provided in its lower end to receive a band in place of a cord for supporting a clasp. Fig. 6 represents a view of a modified form adapted to be used in connection with a single cord which passes around the leg, and also to the clasp. Figs. 7 and 8 represent views of other forms, and illustrating different ways of securing the clasp-supporting cord; and Fig. 9 represents a view of a modified form, which is provided with a hook on either side.

In the drawings, A is a metal plate provided upon one side thereof with one or more slots, *a a*, by means of which a strap or band, B, may be secured thereto, either by passing the end thereof once through said slot and back upon itself, and securing said end to the main portion of the band B by some suitable through-and-through fastening, or by passing said end through the second slot, then turning it backward and passing it through the first or right-hand slot, so that said end will be clamped in an obvious manner, as shown in Figs. 1 and 2. By the latter arrangement the slack in the belt or band B may be readily taken up in an obvious manner, or this might be accomplished by securing the end of the belt or band B to a slide, *b*, mounted upon the said band, also in a well-known manner. It is immaterial how the belt or band B is secured to the flat plate A, provided that there is some arrangement by which any unnecessary slack in said band may be quickly taken up, although this may be accomplished at either end of said band B. The detached end of said belt or band is provided with a suitable loop, *c*, which may be made by turning said end back upon itself and securing the same together by any well-known manner, as shown in Fig. 1.

The flat metal plate A is provided on that side opposite the slot *a* with a downwardly-projecting hook, *d*, by which and the loop *c* the two ends may be readily attached and detached, the projecting point *e*, engaging with said loop *c*, preventing any accidental disengagement thereof.

My invention as thus far described is adapted especially for belts, ladies' garters, sleeve-supporters, &c., and forms for the purpose a most convenient connection; but in order to adapt it for gentlemen's stocking-supporters I provide said plate A with the downwardly-projecting plate C, which extends below the top of the stocking and within the same, and is provided upon that portion of the plate within the stocking with suitable teeth or prongs to engage therewith and support the same, as desired, the strain upon the stocking preventing its disengagement from the said teeth or prongs.

It is sometimes desirable to use a clasp of any well-known construction to seize the stocking, in which case the projecting plate C may be dispensed with and the said clasp secured to the plate A by the single pendent cord *f*, as shown in Fig. 4, by a double cord, *g*, as shown in Figs. 3, 7, or 8; or said clasp may be secured to the end of a strap or band extending from the slot $h$ in the lower end of the plate A, as shown in Figs. 5 and 9.

Instead of a band or strap passing around the leg, a single cord may be used which will pass nearly around the leg through a loop made of webbing and back again to the plate A, to which the two ends of the cord may be secured, or said ends may extend through suitable holes downward, and have secured thereto a suitable clasp to grasp the stocking. A plate adapted to be used in this manner is shown in Fig. 6, together with a portion of the cord, in order to illustrate the manner in which the cord is passed through the four holes (one at the top and three at the bottom) with which said plate is provided.

The plate A may sometimes be used advantageously with a hook on either side; but, as a usual thing, I prefer that form of plate which is provided with but one hook.

The lower end of the hook $d$ is provided with an inwardly-projecting rounded end, $i$, which serves as an additional safeguard to prevent the disengagement of the loop $c$ from the hook $d$ accidentally.

What I claim as new, and desire to secure by Letters Patent of the United States, is—

1. A connection for belts, bands, &c., consisting of a metal plate provided with a downwardly-projecting hook or finger, in combination with a strap or band of webbing or other flat material secured at one end to said plate, and provided with a loop extending transversely across the other end of said strap or band, the opening through said loop being parallel to the flat side of said band and adapted to engage with said hook or finger.

2. A connection for belts, bands, &c., consisting of a metal plate provided with one or more perforations for connecting thereto one end of a strap or band, and also provided with a hook or finger constructed and arranged to receive a loop formed in and extending transversely across the other end of said strap or band, and provided with an inwardly-projecting spur or tooth near the middle of its inner edge to engage with and to prevent the accidental detachment of said loop.

3. A connection for belts, bands, &c., consisting of a metal plate provided with the slot $a$, and the hook or arm $d$, having formed upon its inner edge the projections $e$ and $i$, substantially as described.

4. A connection for belts, bands, &c., consisting of a metal plate having formed therein the slots $a$ and $h$, and provided with the hook or arm $d$, having formed upon its inner edge the spur or tooth $e$, substantially as described.

In testimony whereof I have signed my name to this specification, in the presence of two subscribing witnesses, on this 26th day of March, A. D. 1886.

SIGOURNEY WALES.

Witnesses:
N. C. LOMBARD,
WALTER E. LOMBARD.